(12) United States Patent
Fuksa et al.

(10) Patent No.: US 7,975,717 B2
(45) Date of Patent: Jul. 12, 2011

(54) PIN INSERT

(75) Inventors: Richard C. Fuksa, Park Ridge, IL (US); Jun Zhu, Des Plaines, IL (US)

(73) Assignee: Thomas Industries, Inc., Sheboygan, WI (US)

(*) Notice: Subject to any disclaimer, the term of this patent is extended or adjusted under 35 U.S.C. 154(b) by 1528 days.

(21) Appl. No.: 10/752,651

(22) Filed: Jan. 7, 2004

(65) Prior Publication Data

US 2004/0140006 A1    Jul. 22, 2004

Related U.S. Application Data

(60) Provisional application No. 60/439,071, filed on Jan. 9, 2003.

(51) Int. Cl.
*F16K 15/16* (2006.01)

(52) U.S. Cl. .................. 137/454.4; 137/855; 403/276; 403/283

(58) Field of Classification Search ............. 137/454.4, 137/885, 856, 857, 858, 855; 417/559, 567, 417/569; 403/276, 283
See application file for complete search history.

(56) References Cited

U.S. PATENT DOCUMENTS

| | | | | |
|---|---|---|---|---|
| 2,221,141 A * | 11/1940 | Kindt | ............................ | 403/360 |
| 3,621,868 A * | 11/1971 | Wise | ............................. | 137/105 |
| 4,146,206 A * | 3/1979 | Malloy et al. | .................. | 251/84 |
| 4,182,217 A * | 1/1980 | Runge | ............................ | 411/35 |
| 6,267,527 B1 * | 7/2001 | Miller | ........................... | 403/292 |
| 6,435,758 B1 * | 8/2002 | Hinkel | ......................... | 403/283 |
| 2003/0181560 A1 * | 9/2003 | Kawaguchi et al. | .......... | 524/424 |

OTHER PUBLICATIONS

Applicant's Exhibit A—Typical pin "c" installation in soft material "b" based on interference fit between pin "c" and hole "d" (friction force Fr-Fig. 1), admitted prior art.

* cited by examiner

*Primary Examiner* — Craig M Schneider
(74) *Attorney, Agent, or Firm* — James B. Conte; Husch Blackwell LLP

(57) ABSTRACT

A valve pin insert has a body for insertion into a valve plate and a stud integrally formed with the body and extending from one end of the body above the valve plate. The body has a lower shank at an end of the body that is opposite from the end at which the stud is positioned, and an upper shank at the end of the body adjacent to the end of the body at which the stud is positioned. The lower shank is of a lesser diameter than the upper shank and an undercut shoulder between the shanks forms a recess opening in the direction toward the lower shank and forms a tooth which shears material of the valve plate as the pin is inserted into a hole in the valve plate.

8 Claims, 2 Drawing Sheets

PIN INSERT

CROSS-REFERENCE TO RELATED APPLICATION

This claims the benefit of U.S. Provisional Patent Application No. 60/439,071 filed Jan. 9, 2003.

STATEMENT CONCERNING FEDERALLY SPONSORED RESEARCH OR DEVELOPMENT

Not applicable.

FIELD OF THE INVENTION

This invention relates to a valve pin insert, and particularly a valve pin insert in a polytetraflouroethylene (PTFE) material valve plate.

BACKGROUND OF THE INVENTION

Chemical duty pumps require corrosion-resistant materials to be used. Non-chemical duty pumps, particularly high vacuum, oilless vacuum pumps, have been diaphragm pumps and one of the designs utilizes an aluminum pin press fit into an aluminum valve plate to hold a flapper valve which operated as the pump stroked. The diaphragm hit the pin on each stroke, but since the pin was held firmly in the valve plate by the tight press fit, that was harmless and acceptable.

In chemical duty pumps, the materials of the valve plate must be corrosion resistant and therefore the material of the valve plate is made of PTFE, commonly known as Teflon™. The pins also must be corrosion resistant, but since they are subjected to the stresses of holding the flapper valve, which is stretched over them, they are made of a harder plastic material, for example, glass- or graphite-filled polyetheretherketone ("PEEK"). The valve itself is typically a corrosion resistant elastomer, for example, Kalrez™. Typically the valve is a flat rubber valve attached to the valve plate with two pins. The valve has two oblong holes for the pins to allow movement needed to open and close the valve.

The diaphragm contacting the pins on each stroke causes the pins to become sunk into the valve plate, which adversely affects the operation of the valve. The valve opening may be restricted or it may not be able to completely close. The press fit in the PTFE is not sufficient to prevent this condition.

SUMMARY OF THE INVENTION

The invention provides a new design for a pin and the joint between the valve plate and the pin, which supports the pin at the required height for the pump life. The pin accomplishes this by being provided with a sharpened shoulder which shears the material of the valve plate as the pin is inserted into it, and causes the material under the shoulder to flow and compress in a manner that provides support against the inward forces to which the pin is subjected by the diaphragm.

In the invention, the undercut shoulder forms a tooth that shears material of the valve plate as the pin is inserted into a hole in the valve plate. The shoulder may be molded or machined into the pin, which is preferably made of a relatively harder plastic, such as PEEK. The valve plate is preferably made of a relatively softer plastic, such as PTFE.

In a preferred form, the undercut shoulder extends to a radial depth that is beneath the surface of the lower shank. This forms an outwardly facing shoulder above the lower shank such that when the pin is inserted into the hole, the material that is sheared from the valve plate flows into the undercut and flows and is compacted therein on top of the outwardly facing shoulder, so as to help prevent any springback of the pin out of the hole.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
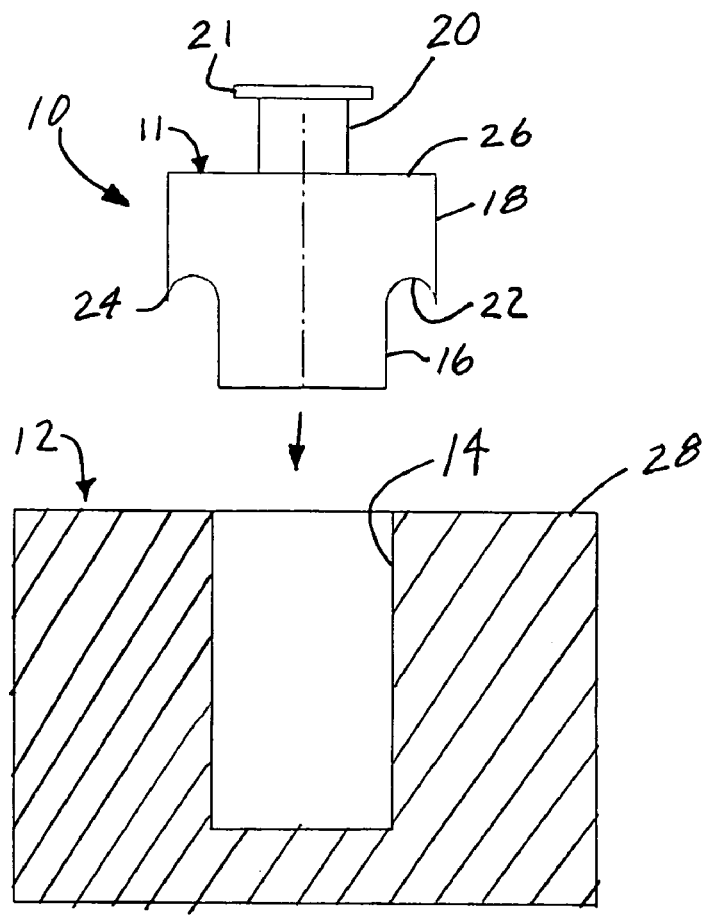
FIG. 1 is a plan view showing a cross-section of a pin of the invention being inserted into a hole in a substrate.

Referring to FIG. 1, a pin 10 of the invention is shown being inserted into a hole 14 of the valve plate 12. Pin 10 has a body 11 with a lower shank 16 of a first diameter and upper shank 18 of a diameter greater than the diameter 16. A stud 20 is integrally connected to the upper shank 18 of the body 11 and extends above the top of the valve plate 12 when the pin 10 is installed in the plate 12 so that the aforementioned valve flapper can be hooked onto the head 21 of the stud 20.

Figure 2:
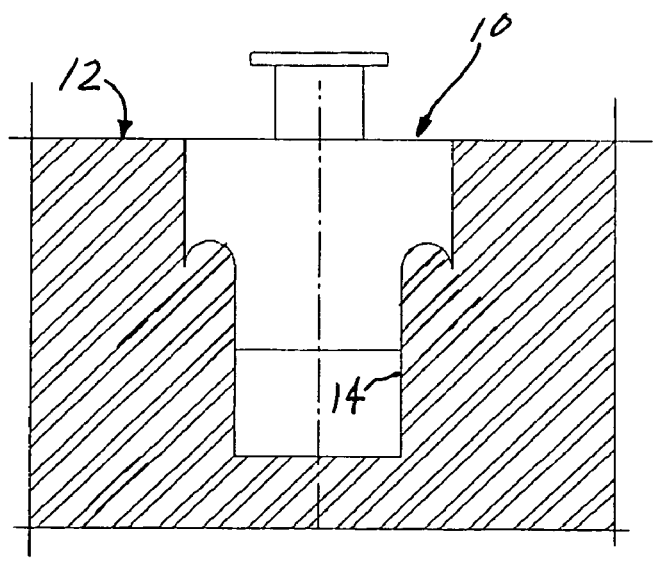
FIG. 2 is a view similar to FIG. 1 of the pin inserted into the substrate.

The junction of the lower shank 16 and the upper shank 18 has a downwardly facing undercut shoulder 22 formed all the way around the pin 10 which forms a sharpened edge or tooth 24, which extends for 360 degrees around the upper shank 18 of the pin 10. Hole 14 is slightly larger than shank 16 and serves to guide the pin 10 as it is inserted into the hole 14. When the end of tooth 24 contacts the upper surface of valve plate 12 around the hole 14 upon initial insertion, with further insertion of the pin 10, the tooth 24 is depressed into the valve plate 12 around the hole 14, and shears the material where it is pressed into it. Insertion continues for approximately an additional 2 mm until the top surface 26 of shank 18 is flush with the top surface 28 of valve plate 12. The force for inserting the pin 10 is preferably applied through the top surface 26 of shank 18, rather than the stud 20, to keep from deforming the stud 20. When fully inserted, the pin 10 and valve plate 12 appear as shown in FIG. 2, with the material that has been sheared by the pin 10 having flowed and been compressed to support the shoulder 22 and the pin 10 against forces placed on it by the diaphragm, which are in a direction to further insert the pin 10 into the hole 14. As stated above, a typical dimension for the length of the shank 18 is 2 mm. A typical dimension for the diameter of the shank 18 is about 6.4 mm, for the diameter of the shank 16 is 5.7 mm and for the diameter of the hole 14 is 5.8 mm.

The material of the valve plate 12 is PTFE, which is a soft and flowable material with low elasticity. Other materials with similar characteristics may also work. However, PTFE is desirable since it also is highly chemical resistant. The combination of shearing, flowing, and compression provided by the invention results in this material becoming compressed and able to resist the loads to which the pin is subjected which would otherwise adversely affect the function of the valve and pump.

The pin 10 is preferably made of a PEEK material which may be either glass-filled, graphite-filled, or otherwise filled. In the embodiment shown in FIG. 2, the pin 10 is capable of being made in a molding process, with the undercut shoulder 22 being formed in the mold process. It would also, however, be possible to machine the undercut into a molded pin, either with an undercut 22 as shaped in FIGS. 1 and 2, or with an undercut 22' as shaped in FIG. 3, the description of which follows.

Figure 3:
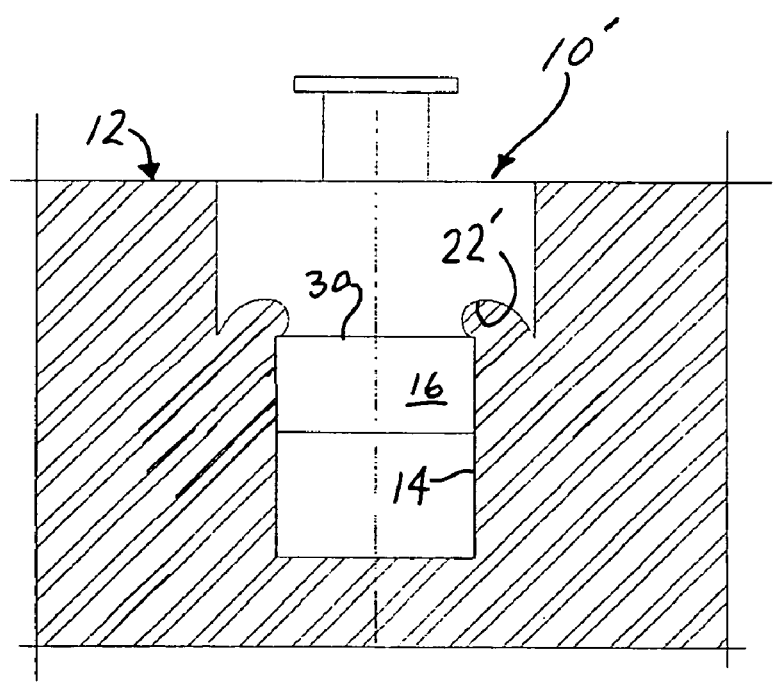
FIG. 3 is a view similar to FIG. 2 illustrating an alternate embodiment of the pin.

The embodiment shown in FIG. 3 is very similar to that shown in FIG. 2, except that the undercut 22' is formed by machining and actually forms a small axially outwardly facing shoulder 30 on top of the lower shank 16 by cutting to a depth below the surface of the lower shank 16. When the pin 10' having the undercut shoulder 22' is inserted into the hole 14, the material which is sheared flows into the undercut 22' and flows and is compacted therein on top of the shoulder 30, so as to help prevent any spring-back of the pin 10' out of the hole 14.

Preferred embodiments of the invention have been described in considerable detail. Many modifications and variations to the preferred embodiments described will be apparent to a person of ordinary skill in the art. For example, studs of various shapes could extend from the body, or a hole could be formed in the body to receive a fastener for securing the valve to the valve plate. Therefore, the invention should not be limited to the embodiments described, but should be defined by the claims which follow.

We claim:

1. A valve pin insert in combination with a valve plate, said pin insert having a body inserted into said valve plate, wherein the body has a lower shank at one end of the body and an upper shank adjacent to the lower shank, the lower shank being of a first diameter and the upper shank being of a second diameter, the first diameter being less than the second diameter and wherein between the lower shank and the upper shank of the body an undercut shoulder forms a recess opening in the direction toward the lower shank, the recess forming a tooth that shears material of the valve plate as the pin is inserted into a hole in the valve plate and wherein said valve pin insert has an insert position, wherein when in said insert position said upper and lower shank are disposed in said valve plate; and said valve pin insert is fixedly connected to said valve plate.

2. The pin of claim 1, wherein the diameter of the lower shank is less than the diameter of the hole in the valve plate.

3. The pin of claim 1 wherein the pin is made of PEEK.

4. The pin of claim 1 wherein the valve plate is made of PTFE.

5. The pin of claim 1 wherein the undercut shoulder is molded into the pin.

6. The pin of claim 1 wherein the undercut shoulder is machined into the pin.

7. The pin of claim 1 wherein the undercut shoulder extends to a depth beneath the surface of the lower shank.

8. The pin of claim 1, further comprising a stud extending axially outwardly from the body.

* * * * *